(No Model.) 2 Sheets—Sheet 1.
J. H. COOPER.
FRICTION CLUTCH.
No. 317,306. Patented May 5, 1885.
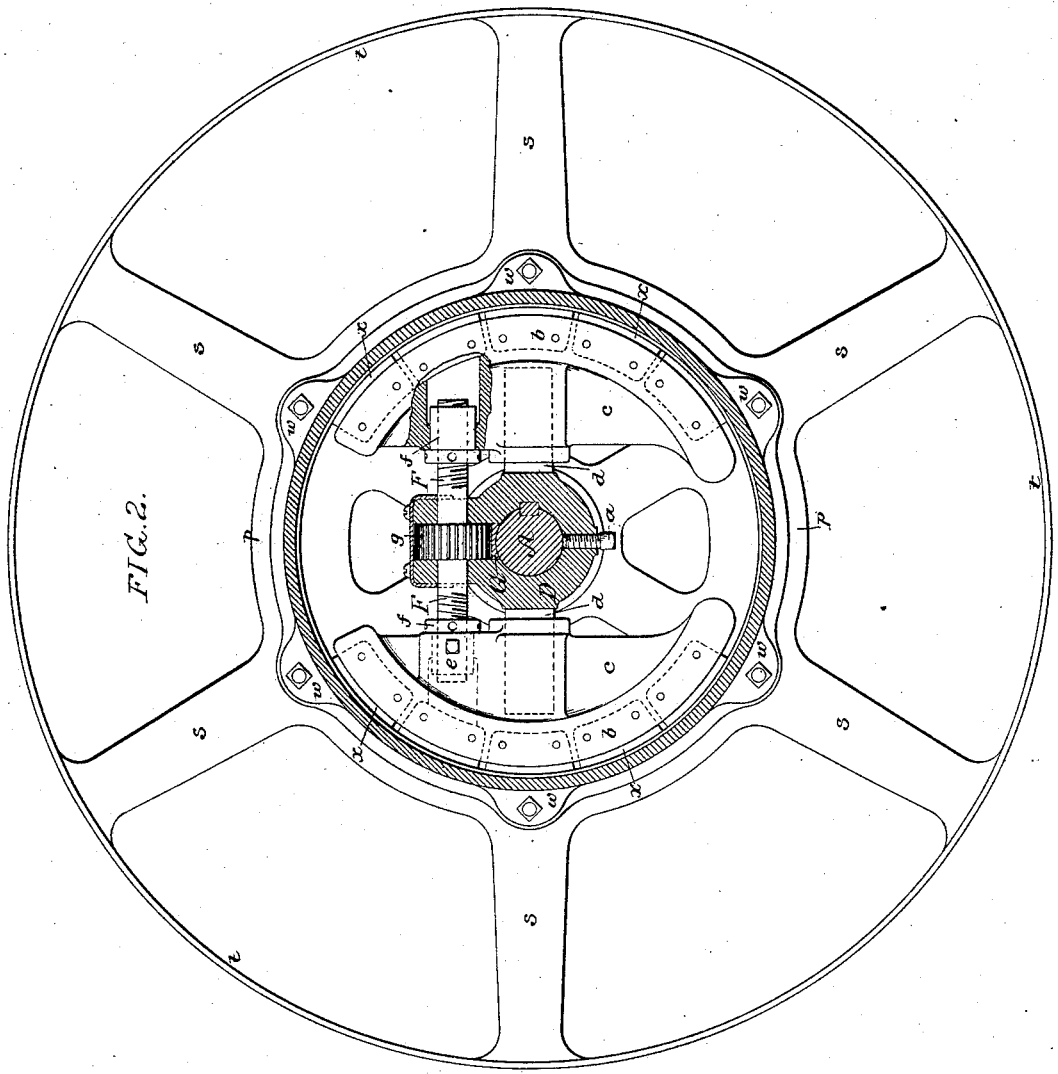
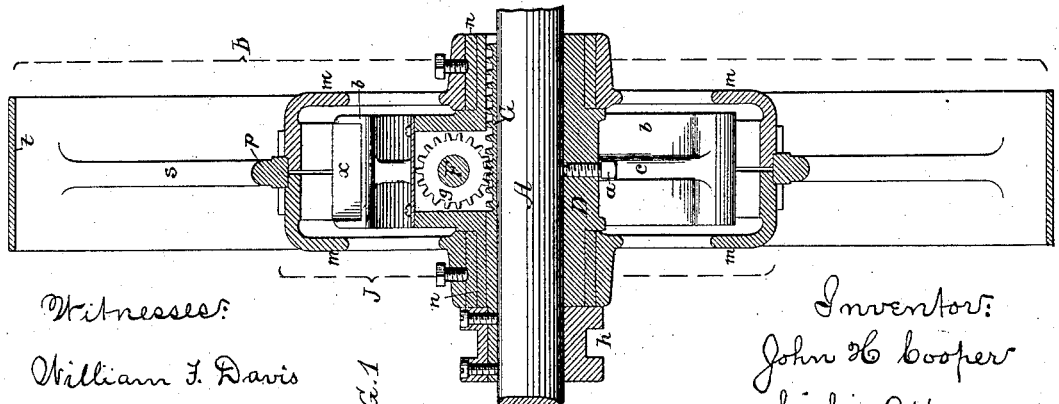
Witnesses:
William F. Davis
Harry Drury
Inventor:
John H. Cooper
by his Attorneys
Howson & Son (No Model.) 2 Sheets—Sheet 2.
J. H. COOPER.
FRICTION CLUTCH.
No. 317,306. Patented May 5, 1885.
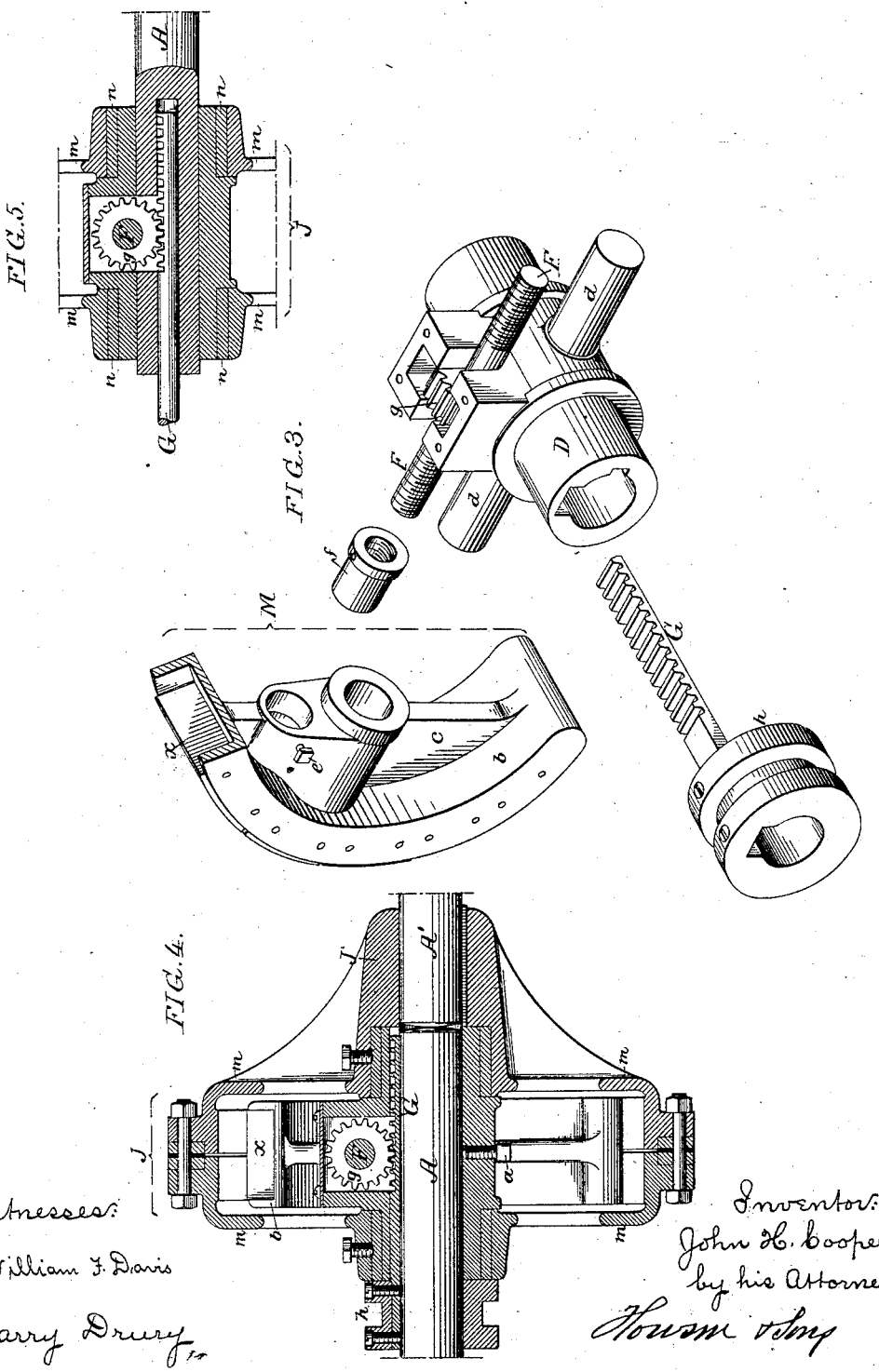

UNITED STATES PATENT OFFICE.

JOHN H. COOPER, OF PHILADELPHIA, PENNSYLVANIA.

FRICTION-CLUTCH.

SPECIFICATION forming part of Letters Patent No. 317,306, dated May 5, 1885.

Application filed March 30, 1885. (No model.)

*To all whom it may concern:*

Be it known that I, JOHN H. COOPER, a citizen of the United States, and a resident of Philadelphia, Pennsylvania, have invented certain Improvements in Friction-Clutches, of which the following is a specification.

My invention relates to that class of clutches of which the well-known Bodmer clutch (Fairbairn's Mills and Millwork, 1863, Vol. 2, page 92) is an example, and in which a boss or driver keyed to a shaft has arms carrying right and left threaded screws which are adapted to nuts on segments bearing against the inner face of a shell or hub which is part of the thing to be driven, the screws being operated by means of a sleeve sliding on the shaft and acting through the medium of levers and links.

The objects of my invention are to provide a proper bearing for the shell or hub upon which the clutch segments act, to render the clutch compact, to protect the clutching devices, and to permit a change in size of a wheel or pulley without change of the clutching mechanism.

In the accompanying drawings, Figure 1 is a longitudinal section, partly in elevation, of a shaft and pulley with friction-clutch constructed in accordance with my invention; Fig. 2, a side view of the same, partly in section; Fig. 3, a perspective view of some of the parts of the clutch; Fig. 4, a view showing a shaft-coupling embodying the invention, and Fig. 5 a view showing a modified plan of operating the clutch.

A is a shaft to which power is applied, and B a pulley or wheel which is to be clutched to or released from said shaft; or the power may be applied to the pulley or wheel, and the shaft may be driven therefrom.

In the specification I will, for convenience, allude to the part B as a pulley, and will also assume that the shaft A is a driving-shaft.

Keyed to the shaft A, and prevented from moving longitudinally thereon by a set-screw, $a$, is a sleeve, D, which I will term a "driver," as it need not necessarily be a sleeve, but can be a frame of any desired character adapted to carry the clutch-shoes M and the devices for expanding the same. In the present instance the clutch-shoes consist of segmental plates $b$, within recesses in which are secured the usual wooden friction-blocks, $x$, the segmental plates having transverse ribs $c$, enlarged to form bosses for the reception of the supporting-pins $d$ and nuts $f$. The pins $d$ project from opposite sides of the driver D, and the nuts fit snugly in the openings in the segments, and are prevented from turning therein by set-screws $e$, the inner end of each nut having a flange which bears against the inner face of the boss, as shown in Fig. 2. The nuts are threaded for the reception of the opposite ends of the screw-stem F, one end having a left-hand thread and the other end a right-hand thread.

The screw-stem F is adapted to slotted bearings on the driver D, in which bearings the stem can turn freely; and secured to the stem and confined longitudinally between the bearings is a spur-wheel, $g$, with which engages a rack, G, the latter fitting snugly to a recess in the driver and having a bearing upon the shaft A.

The rack is free to move longitudinally in the driver D, and the outer end of the rack is connected to a grooved sleeve, $h$, which may be under control of a suitable operating-lever.

The friction-blocks of the clutch-shoes bear upon the inner face of the hollow shell or hub J of the wheel B, which is made in halves $m$ $m$, one of which has a bearing on one end of the driver D, and the other a bearing on the opposite end of said driver, the bearings being preferably provided with suitable bushings, $n$. By this means the clutching mechanism is inclosed and protected, and the pulley has a bearing on each side of said clutching mechanism, so that said pulley is better balanced and its bearings are less subject to wear than in an ordinary friction-pulley which has but one bearing.

The pulley has an inner ring, $p$, connected by spokes $s$ to the rim $t$, and this portion of the pulley is confined by bolts to lugs $w$ on the halves of the central shell, J, so that pulleys or wheels of different size or character can readily be used in connection with the shell and its clutching mechanism.

The operation of the clutch is as follows: When the rack G is drawn outward, the nuts $f$ are retracted on the screw-stem F, and the friction-blocks of the shoes M are free from contact with the interior of the shell J, the pulley being free from the control of the shaft. When the rack is moved inward, however, the screw-stem F is rotated or partially rotated, so that the nuts $f$ are forced outward, the shoes M being consequently expanded, so as to clutch the shell J and cause the rotation of the same and the pulley with the shaft. The nuts $f$ can, on loosening the set-screws $e$, be turned in one direction or the other, so as to adjust the clutch-shoes M to compensate for inequalities due to the unevenness of wear or other causes, uniform action of the shoes upon the shell J being thus insured.

Two screw-stems and two racks, one on each side of the shaft, may be used, if desired, so as to apply pressure to both ends of the clutch-shoes; but I have found in practice that one screw-stem is sufficient.

In Fig. 4 I have shown a device constructed in accordance with my invention for coupling two shafts, A A′, the shell J in this case an elongated hub, J′, which is bolted, keyed, or otherwise secured to the shaft A′.

Either of the shafts may be the driver.

In the modification of the invention shown in Fig. 5 the operating-rack G is located in the center of the shaft A, which is slotted for the reception of part of the pinion $g$, the end of the shaft being exposed for the projection of the end of the rack.

If desired, the shell J may have its bearings on the shaft instead of on the driver when the rack is inside the shaft; or instead of the threaded stem, rack, and pinion for operating the clutch-shoes the latter may be operated by levers, links, and wedges, if desired.

I claim as my invention—

1. The combination, in a friction-clutch, of a shaft, clutching mechanism carried thereby, and a shell or hub upon which said clutching mechanism acts, said shell having a bearing on both sides of the clutching mechanism, as set forth.

2. The combination of a shaft, clutching mechanism carried thereby, a shell or hub upon which said mechanism acts, and an outer pulley structure detachably secured to said shell, as set forth.

3. The combination of the shaft, the driver thereon, clutching mechanism carried by said driver, and a hub or shell having bearings upon the opposite ends of the driver, as specified.

4. The combination of the shaft, the driver thereon, clutching mechanism carried by said driver, and a hub or shell made in halves, as set forth.

5. The combination of the shaft, the driver thereon, clutching mechanism carried thereby, a shell or hub upon which the clutch acts, and an operating rack or stem projecting into the shaft or driver-hub, as set forth.

6. The combination of the shaft, the hollow hub or shell, the clutch-shoes, the screw-stem adapted to nuts on the shoes, and having a pinion, an operating-rack and a driver secured to the shaft and carrying the clutch-shoes, screw-stem, and rack, as specified.

7. The combination of the driver, the screw-stem, the clutch-shoes, and the nuts adapted to the screw-stem and detachably secured to the shoes, whereby they can be turned so as to adjust the shoes, as set forth.

8. The combination of the shaft, the hollow hub or shell, the driver having projecting pins, the clutch-shoes hung to and movable on said pins, and means for expanding the shoes, as set forth.

In testimony whereof I have signed my name to this specification in the presence of two subscribing witnesses.

JOHN H. COOPER.

Witnesses:
HARRY SMITH,
HENRY HOWSON.